United States Patent
Zhao et al.

(10) Patent No.: US 12,445,512 B2
(45) Date of Patent: Oct. 14, 2025

(54) METHODS AND SYSTEMS FOR CONTENT STREAM CODING

(71) Applicant: Comcast Cable Communications, LLC, Philadelphia, PA (US)

(72) Inventors: Zhen Zhao, Berwyn, PA (US); Sadasivan Ponnuswamy, New York, NY (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/679,800

(22) Filed: May 31, 2024

(65) Prior Publication Data

US 2025/0080596 A1    Mar. 6, 2025

Related U.S. Application Data

(63) Continuation of application No. 14/881,968, filed on Oct. 13, 2015, now Pat. No. 12,041,107.

(51) Int. Cl.
*H04L 65/70* (2022.01)
*H04L 1/00* (2006.01)
*H04L 65/612* (2022.01)
*H04L 65/80* (2022.01)
*H04N 19/00* (2014.01)
*H04N 19/65* (2014.01)
*H04L 69/16* (2022.01)

(52) U.S. Cl.
CPC .............. *H04L 65/70* (2022.05); *H04L 1/00* (2013.01); *H04L 65/612* (2022.05); *H04L 65/80* (2013.01); *H04N 19/00* (2013.01); *H04N 19/65* (2014.11); *H04L 69/16* (2013.01)

(58) Field of Classification Search
CPC ......... H04L 65/70; H04L 1/00; H04L 65/612; H04L 65/80; H04L 69/16; H04N 19/00; H04N 19/65

See application file for complete search history.

(56) References Cited

U.S. PATENT DOCUMENTS

| | | | |
|---|---|---|---|
| 5,870,412 A | 2/1999 | Schuster et al. | |
| 6,771,674 B1 | 8/2004 | Schuster et al. | |
| 2007/0033494 A1* | 2/2007 | Wenger | H04N 19/147 375/E7.153 |
| 2007/0165673 A1* | 7/2007 | Huang | H04L 1/0057 370/474 |
| 2008/0222494 A1 | 9/2008 | Gondo et al. | |
| 2011/0145638 A1 | 6/2011 | Syrgabekov et al. | |

(Continued)

FOREIGN PATENT DOCUMENTS

WO    WO-2007061087 A1 *   5/2007   ............. H04L 1/205

*Primary Examiner* — Philip C Lee
(74) *Attorney, Agent, or Firm* — Ballard Spahr LLP

(57) ABSTRACT

Methods and systems are provided for encoding content using a first encoding algorithm to produce first encoded content. Content can also be encoded using a second encoding algorithm to produce second encoded content, where the second encoded content can comprise data that can be used to reconstruct the first encoded content. At any time relative to the encoding, a request for the content can be received from a user device. In response to receipt of the request, the first encoded content is transmitted to the user device and the second encoded content is transmitted to the user device.

36 Claims, 6 Drawing Sheets

(56) References Cited

U.S. PATENT DOCUMENTS

| | | | |
|---|---|---|---|
| 2011/0219287 A1* | 9/2011 | Srinivas | H04L 47/193 |
| | | | 714/752 |
| 2011/0243155 A1 | 10/2011 | Gondo et al. | |
| 2012/0163221 A1* | 6/2012 | Miyazawa | H04L 65/762 |
| | | | 370/252 |
| 2012/0233516 A1 | 9/2012 | Gondo | |
| 2012/0250690 A1* | 10/2012 | Suh | H04L 47/2408 |
| | | | 370/392 |
| 2013/0044835 A1 | 2/2013 | Sevin et al. | |
| 2015/0222555 A1* | 8/2015 | Rickeby | H04L 47/2416 |
| | | | 370/230 |
| 2017/0034589 A1 | 2/2017 | Rozenberg et al. | |
| 2017/0094294 A1* | 3/2017 | Gu | H04N 19/115 |

* cited by examiner

METHODS AND SYSTEMS FOR CONTENT STREAM CODING

CROSS-REFERENCE TO RELATED APPLICATIONS

This application is a continuation of U.S. patent application Ser. No. 14/881,968, filed Oct. 13, 2015, which is hereby incorporated by reference in its entirety.

BACKGROUND

Currently, streaming video applications and websites that provide streaming video provide videos as a sequence of blocks. For example, the blocks can be segments transmitted using Transmission Control Protocol (TCP). Each segment is encoded using an error correcting code. The error correcting code is used, for example, for correcting small errors introduced by interference or other problems during transmission. However, the code can only be used to fix errors within the same segment. The code provides no information for other segments.

Typically, there is a loss in the range of 1-2 percent during the streaming transmission. More specifically, typically 1-2 percent of segments transmitted from a content provider are not received at a receiving device. When a segment is lost, the receiving device notifies the content provider of the loss and waits for the content provider to resend the segment while holding all subsequently received packets. This results in receipt of all data needed for the streaming video at the receiving device, but can cause the streaming video to pause while waiting for resent segments to arrive. A conventional solution to this problem is to increase available bandwidth between the sending device and the receiving device. While the increased bandwidth helps to reduce delays introduced by resending data, it does not affect the need for resending. These and other shortcomings will be addressed in the following disclosure.

SUMMARY

It is to be understood that both the following general description and the following detailed description are exemplary and explanatory only and are not restrictive.

Provided are methods and systems for video stream encoding. Content (e.g., a video stream requested by a user) requested by a user device can be divided into a series of blocks by a content provider (e.g., sized appropriately for TCP segments, Internet Protocol packets, Ethernet frames, etc.) and encoded using a first encoding algorithm (e.g., using an MPEG-2 or H.264 encoder, etc.) to produce a first encoded content stream. A second encoded content stream can be produced by re-encoding the first encoded content stream using a second encoding algorithm. For example, the second encoded content stream can be produced by performing a logical operation on adjacent blocks of the first encoded content stream (e.g., blocks 1 and 2, blocks 2 and 3, etc.) to form blocks of the second encoded content stream. In some examples, the blocks of the second encoded content stream can further be encoded using a known encoding algorithm.

The second encoded content stream can be used to reconstruct one or more missing blocks of the requested content. For example, the logical operation used to combine blocks of the first encoded content stream to form the second encoded content stream can be a reversible operation, such that each of the two adjacent blocks of the first encoded content stream used as input can be recovered based on the block of the second encoded content stream. One example of a reversible logical operation is an exclusive disjunction ("exclusive or" or XOR) operation. The first encoded content stream and the second encoded content stream can be communicated from the content provider (e.g., a content source) to a user device. For example, the first encoded content stream and the second encoded content stream can be transmitted in parallel. Optionally, the content provider can determine if spare bandwidth at the content provider exceeds a bandwidth threshold. If the spare bandwidth exceeds the bandwidth threshold, the content provider can send the second encoded content stream to the user device. If a block of the requested content is lost in the first encoded content stream, the block can be locally recovered by performing a logical operation on blocks received from the second encoded content stream and the received blocks of the first encoded content stream.

In another example, a request for content can be sent to a content provider from a user device. The user device can receive a first block of a first encoded content stream from the content provider. The first encoded content stream can comprise the requested content encoded using a first encoding algorithm. The user device can also receive a second encoded content stream, the second encoded content stream comprising data that can be used to reconstruct the first encoded content stream. The user device can determine that a second block of the first encoded content stream is missing, wherein the second block of the first encoded content stream immediately follows the first block of the first encoded content stream based on block contents. The second block of the first encoded content stream can be reconstructed based on the first block of the first encoded content stream and a first block of the second encoded content stream. For example, the first block of the second encoded content stream can be formed by performing a logical operation (e.g., an exclusive or (XOR) operation) on the first block of the first encoded content stream and the second block of the first encoded content stream. If the second block of the first encoded content stream is determined to be missing, the user device can reconstruct the second block of the first encoded content stream locally by performing a complementary logical operation on the first block of the first encoded content stream and the first block of the second encoded content stream. As an example, when an XOR operation is used to combine the first block of the first encoded content stream and the second block of the first encoded content stream to produce the first block of the second encoded content stream, an XOR operation can also be used to reconstruct the second block of the first encoded content stream from the first block of the first encoded content stream and the first block of the second encoded content stream.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
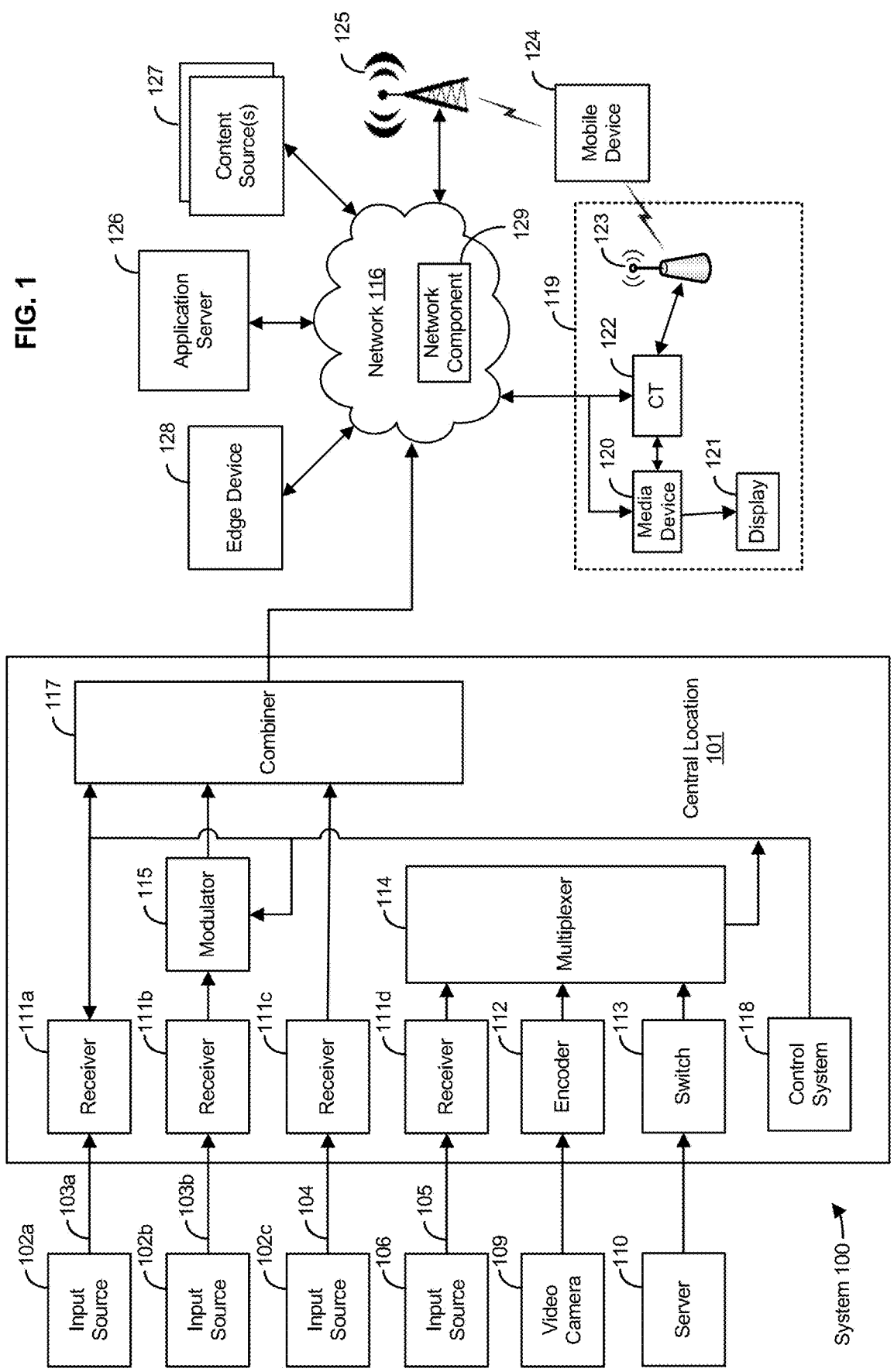
FIG. 1 illustrates various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems disclosed can use spare bandwidth available between a content provider (e.g., a content source) and a user device to provide enhanced content encoding with support for reconstructing lost blocks of content. Spare bandwidth can be, for example, bandwidth allocated for use between the content provider and the user device that is not being used for content delivery or other user services. That is, if 500 Mb of data is allocated for use between the content provider and the user device in a specified time frame and 200 Mb of data is used for content delivery and other services in the specified time frame, then 300 Mb of data can be determined to be spare bandwidth in the specified time frame. The content provider, or a computing device in communication with the content provider, can encode content and transmit the encoded content as a stream (e.g., a first encoded content stream). In an example, the first encoded content stream can be encoded using one or more encoding techniques such as traditional block-based content encoding. Traditional block-based encoding can include dividing content into a plurality of blocks sized for transfer from the content provider to the user device. One or more (e.g., each) of the plurality of blocks can then be encoded using a known encoding method. The encoding can include inserting an intra-block error correcting code into the block. The intra-block error correcting code can facilitate correction of errors within a block of the first encoded content stream. However, the intra-block error correcting code cannot recover a lost block (e.g., lost in transmission from the content provider to the user device).

The content provider can also re-encode the first encoded content stream and transmit the re-encoded content as an additional stream (e.g., a second encoded content stream). In an example, the second encoded content stream can be encoded using one or more encoding techniques such as inter-block stream encoding. Inter-block stream encoding can combine multiple blocks of the first encoded content stream. The inter-block stream encoding process can encode two successive content blocks into a single encoded block. As an example, the first encoded content stream can comprise encoded content blocks a1, a2, a3, a4, etc. The second encoded content stream can comprise encoded blocks formatted as (a1 $\oplus$ a2), (a2$\oplus$a3), (a3$\oplus$a4), etc. In this way, a single lost block of the requested content can be reconstructed at the user device based on an adjacent (e.g., either immediate preceding or immediately succeeding) block. The second encoded content stream is transmitted using excess spare bandwidth between the content provider and the user device. In an example, the inter-block encoding can use a reversible logical operation (e.g., an exclusive or (XOR) operation) to combine the blocks of the first encoded content stream. Use of a reversible logic operation allows the combination to be reversed if one of the blocks of the first encoded content stream is determined to be missing (e.g., lost in transmission from the content provider to the user device) to produce the blocks of the first encoded content stream.

The content provider can thus transmit the first encoded content stream and the second encoded content stream to a user device. In an example, the content provider can transmit the first encoded content stream using bandwidth allocated to the user by the content provider and can transmit the second encoded content stream using spare bandwidth. Moreover, in some examples, if spare bandwidth is unavailable, only the first encoded content stream is provided to the user device. Accordingly, the worst-case performance of the system matches conventional performance.

The user device can receive the first encoded content stream and decode the first encoded content stream to render the content on the user device (or other device connected to the user device). The user device can also receive the second encoded content stream formed by encoding successive blocks of the first encoded content stream. In the event that a block is missing from the first encoded content stream, the user device can reconstruct the missing block based on the second encoded content stream and one of a block immediately preceding the missing block in the first encoded content stream or a block immediately following the missing block in the first encoded content stream. As a particular example, the first encoded content stream can comprise encoded content blocks a1, a2, a3, a4, etc. The second encoded content stream can comprise encoded blocks formatted as (a1$\oplus$a2), (a2$\oplus$a3), (a3$\oplus$a4), etc. If the content block a3 is missing from the first encoded content stream, the user device can reconstruct the block a3 locally, without the need to contact the content provider. The user device can perform a logical operation on the block (a2$\oplus$a3) of the second encoded content stream and the block a2 of the first encoded content stream to reconstruct the missing block a3 (e.g. (a2$\oplus$a3) $\oplus$ a2=a3). Thus, block a3 is reconstructed locally, rather than requesting that the content provider retransmit the block a3.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. In an aspect, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an aspect, a multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

In an aspect, the communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

In an aspect, the user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

In an aspect, the user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

In an aspect, the system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

In an aspect, the system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. In an aspect, the content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

In an aspect, the system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

In an aspect, the network 116 can comprise a network component 129. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like.

In an exemplary embodiment, the methods and systems disclosed can be located within one or more of the central location 101, the input sources 102, a user device (e.g., the media device 120, the display 121, the communication terminal 122, and/or the mobile device 124), or any combination thereof.

In particular, a user device (e.g., the media device 120, the display 121, the communication terminal 122, and/or the mobile device 124, etc.) can communicate a request for content to the content provider (e.g., the central location 101). In response, the content provider can communicate first encoded content and second encoded content to the user device via the distribution system 116. In an example, the first encoded content can be communicated as a first encoded content stream and the second encoded content can be communicated as a second encoded content stream. In an example, the first encoded content stream can comprise the requested content, encoded using an encoding method such as MPEG-2, H.264, or the like. In an example the second encoded content stream can comprise a stream-based re-encoding of the first encoded content stream using a logical algorithm, where each block of the second encoded content stream can be used to reconstruct a portion of the first encoded content stream.

The user device can receive the first encoded content stream and the second encoded content stream from the content provider. In an example, when a particular block of the first encoded content stream is not received at the user device, the user device can reconstruct the missing block of the first encoded content stream based on the block of the first encoded content stream immediate preceding the missing block based on the block contents and a corresponding block of the second encoded content stream. In an example, the reconstruction can be based on a logical algorithm that is complementary to the logical algorithm used to encode the second encoded content stream.

Figure 2:
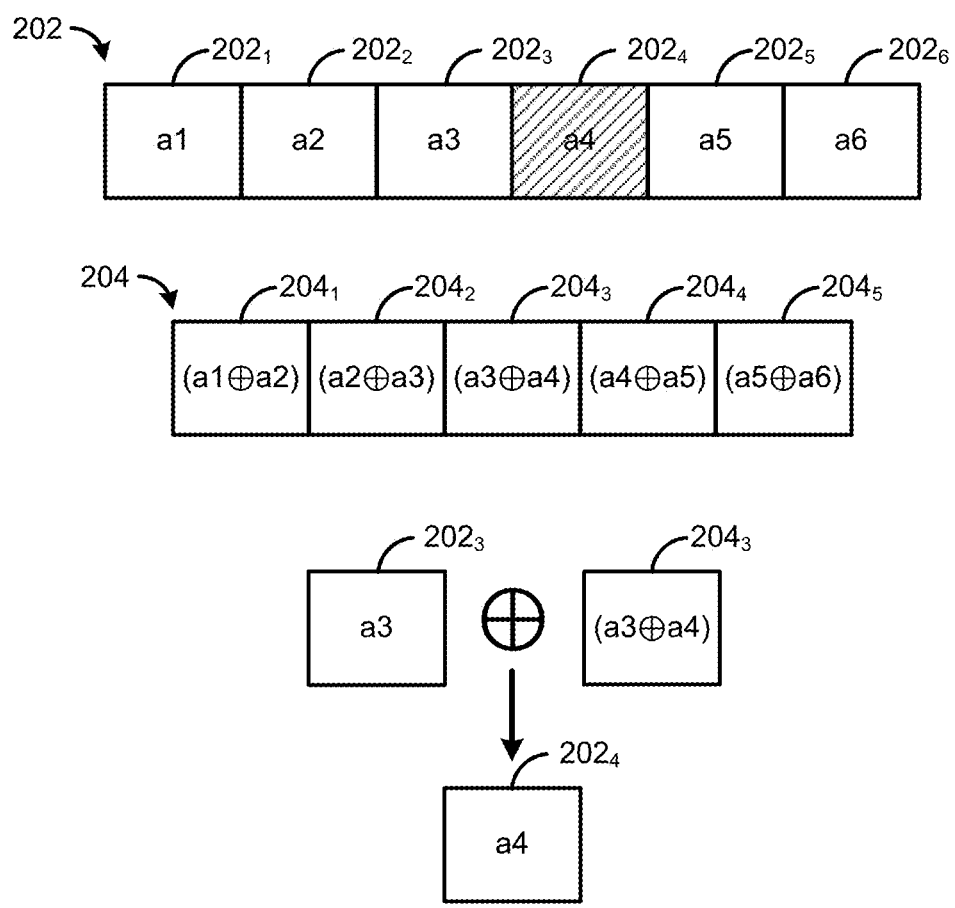
FIG. 2 illustrates reconstructing a block.

FIG. 2 shows an example of a reconstruction process. A first encoded content stream 202 and a second encoded content stream 204 can be formed. For example encoding can be performed at a content provider (e.g., the central location 101, the input sources 102, etc.). In an example, the first encoded content stream 202 can be formed by dividing a content asset into a plurality of blocks. Further, the plurality of blocks can be encoded using a block-based video encoding format. As an example, known formats such as MPEG-2, H.264, or other similar formats could be used. As shown in FIG. 2, a portion of the first encoded content stream 202 can comprise blocks 2021-2026. In an example, the second encoded content stream 204 can be formed from a plurality of blocks. As shown in FIG. 2, a portion of the second encoded content stream 204 can comprise the blocks 2041-2045. In an example, each of the blocks of the second encoded content stream 204 can be formed by performing a bitwise logical operation on two adjacent blocks of the first encoded content stream 202. For example, block 2041 of the second encoded content stream 204 can be formed by performing a bitwise logical operation on blocks 2021 and 2022 of the first encoded content stream 202. In an example, the bitwise logical operation can comprise a reversible logical operation, such as an exclusive disjunction. In an example, each block (e.g., 2041-2045) of the second encoded content stream 204 can be the same size as each of the blocks 2021-2026 that form the first encoded content stream 202. In an example, the blocks of the second encoded content stream can be further encoded using a known encoding method.

The first encoded content stream 202 and the second encoded content stream 204 can be transmitted to a user device (e.g., the HCT 120, the TV 121, etc.). In an example, one or more blocks of the first encoded content stream 202 can be lost during the transmission. For example, the block 2024, shown hatched in FIG. 2, can be lost during transmission to the user device. The user device can determine that the block 2024 is missing. For example, the user device can determine a block is missing when a later block (e.g., block 2025) is received and the block 2024 has not yet been received.

In response to a determination that a block is missing, the user device can reconstruct the missing block locally, rather than requesting that the content provider. In an example, reconstructing the missing block (e.g., block 2024) can be performed by applying a logical operation to a block immediately preceding the missing block in the first encoded content stream 202 (e.g., block 2023) and a corresponding block of the second encoded content stream 204 (e.g., block 2043). As an example, the logical operation can be a complementary logical operation with respect to the logical operation used to form the blocks of the second encoded content stream 204. In particular, when an exclusive disjunction is used to form the blocks of the second encoded content stream 204, an exclusive disjunction can also be used in the reconstruction. An output of the logical operation can be a reconstruction of the missing block (e.g., block 2024).

Figure 3:
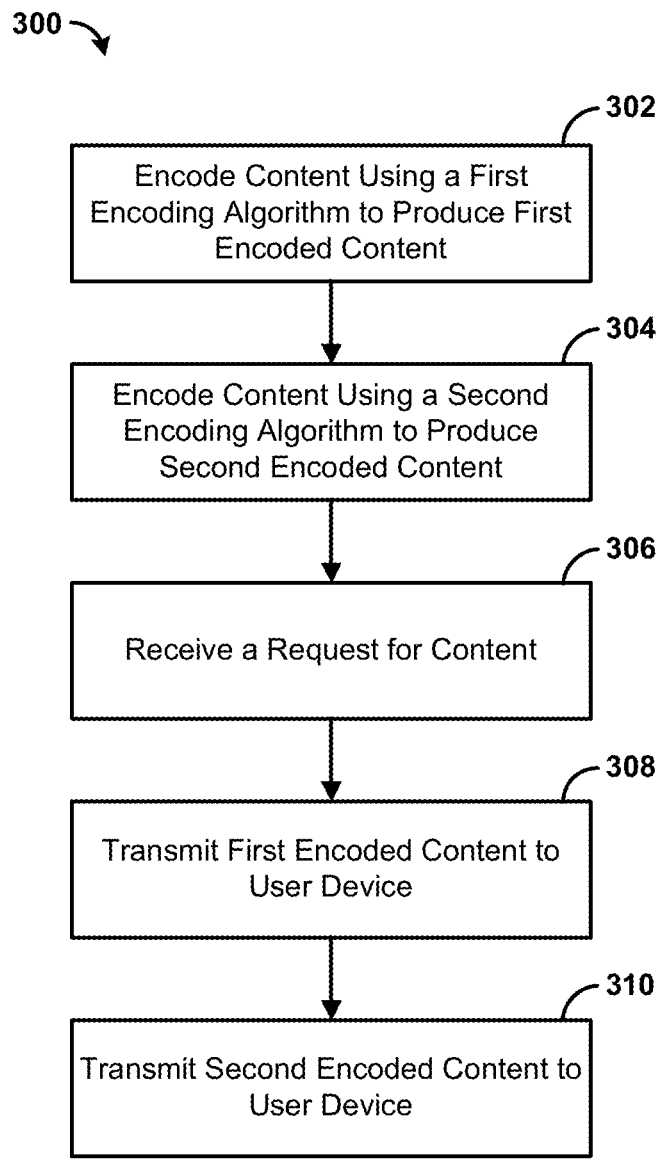
FIG. 3 is a flowchart illustrating an example method.

FIG. 3 shows an exemplary method 300. In step 302, a content provider (e.g., the central location 101, etc.) can encode content using a first encoding algorithm to produce first encoded content stream. In an example, the content can comprise video and/or audio content. As an example, the content can comprise video on demand (VOD) content. As another example, the content can comprise any content displayed in response to a user request (e.g., content delivered via the Internet). In an example, the content can be divided into a plurality of ordered blocks. The blocks can be sized for network communication as TCP segments, IP packets, Ethernet frames, or the like. Encoding the content can comprise encoding a video using a video encoding format such as MPEG-2, H.264, or other similar formats. In an example the encoding can comprise separately encoding each of the blocks of the content, and including an error correcting code in each of the encoded blocks. The error correcting code can detect and/or correct errors within the block. In an example, the first encoded content stream can be a plurality of ordered blocks.

In step 304, the content provider can re-encode the first encoded content stream using a second encoding algorithm to produce second encoded content stream. In an example, the plurality of ordered blocks of the first encoded content stream can be combined to form the second encoded content stream. In an example, the second encoded content stream can comprise data that can be used to reconstruct the first encoded content stream. In an example, the second encoded content stream can be produced by applying a logical operation to two adjacent blocks of the ordered blocks of the first encoded content stream. For example, the first block of the second encoded content stream can be formed by combining the first and second blocks of the first encoded content stream, the second block of the second encoded content stream can be formed by combining the second and third blocks of the first encoded content stream, etc. As an example, the first encoded content stream can comprise blocks (A1), (A2), (A3), (A4), etc., and the second encoded content stream can comprise blocks (A1+A2), (A2+A3), (A3+A4), etc. In an example, the logical operation can comprise one or more reversible logic operations. For example, a reversible logical operation is an operation where a complementary logical operation can be performed using an output of the logical operation to recreate inputs of the logical operation. One such reversible logical operation is an exclusive or (XOR) operation (exclusive disjunction). In some examples, the blocks of the second encoded content stream can further be encoded using a known encoding algorithm.

In step 306, the content provider can receive a request for the content from a user device. In an example, the user device can comprise the media device 120, the display 121, the communication terminal 122, the mobile device 124, etc. The request for content can comprise a request to view content, a request to store content, or the like. In an example, the request for content can comprise one or more additional parameters requesting transmission of the second encoded content stream. In another example, the request for content can comprise a first request for the first encoded content stream and a second request for the second encoded content stream.

In step 308, the content provider can transmit the first encoded content stream to the user device in response to receiving the request for content. In an example, the transmission can comprise transmitting the first encoded content stream to the user device as streaming content. In an example, the first encoded content stream can be transmitted as segments using a TCP connection, as packets using an IP connection, or the like.

In step 310, the content provider can transmit the second encoded content stream to the user device in response to receiving the request for content. In an example, the second encoded content stream can be transmitted to the user device in parallel with the first encoded content stream. For example, the first encoded content stream and the second encoded content stream can be transmitted to the user device substantially simultaneously. In an example, the transmission can comprise transmitting the second encoded content stream to the user device as streaming content. In an example, the second encoded content stream can be transmitted as segments using a TCP connection, as packets using an IP connection, or the like. In an example, the second encoded content stream can be transmitted in the same way as the first encoded content stream. In another example, the first encoded content stream can be transmitted using a first protocol, and the second encoded content stream can be transmitted using a second protocol.

In an example, the first encoded content stream and the second encoded content stream can be transmitted to the user device via separate links. For example, the first encoded content stream can be transmitted from the content provider to the user device via a first link and the second encoded content stream can be transmitted from the content provider to the user device via a second link. In an example, the first link and the second link can comprise distinct physical paths from the content provider to the user device. Alternatively, the first link and the second link can comprise different logical connections between the content provider and the user device, but can comprise the same physical path.

In an example, the content provider can determine if there is sufficient bandwidth available between the user device and the content provider prior to beginning transfer of the second encoded content stream. For example, the content provider can determine if spare (e.g., unutilized) bandwidth available between the user device and the content provider exceeds a bandwidth threshold. For example, the bandwidth threshold can be approximately 15 MB/s. In another example, the bandwidth threshold can be set to be proportional to the bandwidth required to transmit the first encoded content stream. For example, the bandwidth threshold can be set to be equal to a percentage (e.g., 15%, 50%, 100%, etc.) of the bandwidth required to transmit the first encoded content stream. In an example, the second encoded content stream is transferred only when it is determined that the available spare bandwidth exceeds the bandwidth threshold.

Figure 4:
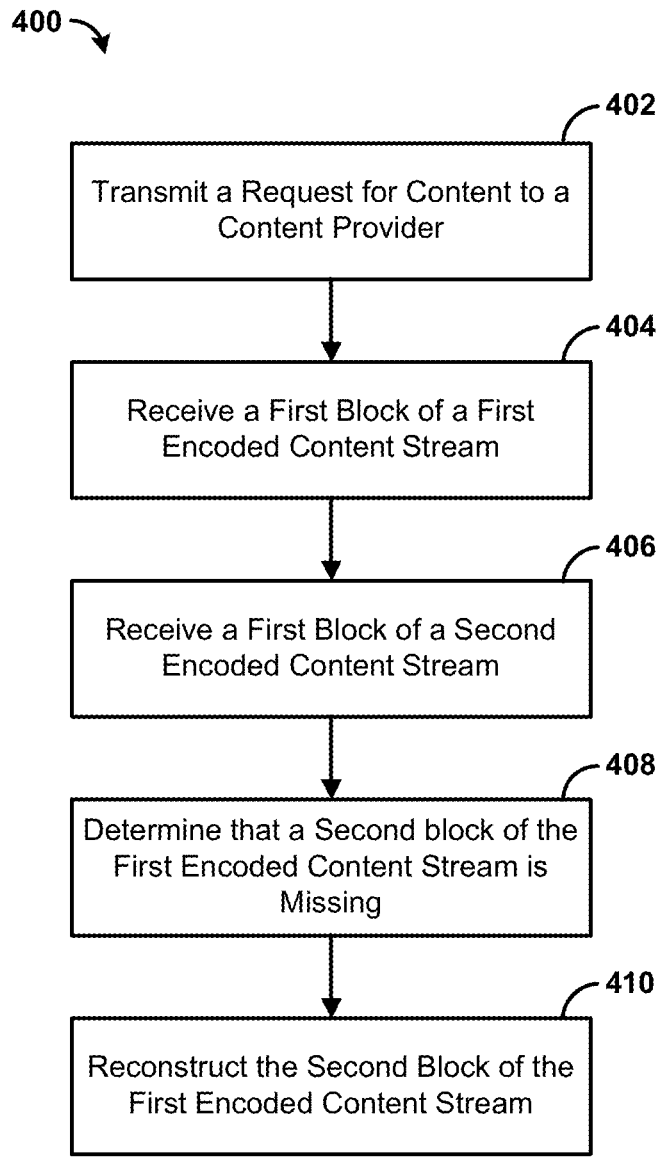
FIG. 4 is a flowchart illustrating an example method.

FIG. 4 shows another exemplary method 400. In step 402, a user device (e.g., the media device 120, the display 121, the communication terminal 122, and/or the mobile device 124) can transmit a request for content to a content provider. (e.g., the central location 101). The request for content can comprise a request to view content, a request to store content, or the like. In an example, the request for content can comprise one or more additional parameters requesting transmission of second encoded content stream. In another example, the request for content can comprise a first request for first encoded content stream and a second request for second encoded content stream. In an example, the requested content can comprise video and/or audio content. As an example, the content can comprise video on demand (VOD) content. As another example, the content can comprise any content displayed in response to a user request. In an example, the content can be divided into a plurality of ordered blocks at the content provider.

In step 404, the user device can receive a first block of a first encoded content stream. In an example, the first block can comprise one of a first TCP segment, a first IP packet, a first Ethernet frame, or the like. The first block of the first encoded content stream can be received via a first link between the content provider and the user device.

In an example, the first encoded content stream can comprise the requested content encoded using a first encoding algorithm. In an example, the requested content can be divided into a plurality of ordered blocks. The blocks can be sized for network communication as TCP segments, IP packets, Ethernet frames, or the like. Encoding the content can comprise encoding a video using a video encoding format such as MPEG-2, H.264, or other similar formats. In an example, the encoding can comprise separately encoding each of the blocks of the content, and including an error correcting code in each of the encoded blocks. The error correcting code can detect and/or correct errors within the block. For example, when the requested content comprises a plurality of ordered blocks, the first encoded content stream can also comprise a plurality of ordered blocks. In an example, each block of the first encoded content stream can correspond to a block of the requested content.

In step 406, the user device can receive a first block of a second encoded content stream. In an example, the first block of the second encoded content stream can comprise one of a first TCP segment, a first IP packet, a first Ethernet frame, or the like. The first block of the second encoded content stream can be received via a second link between the content provider and the user device. In an example, the second link can comprise a distinct physical path from the content provider to the user device as compared to the first link. Alternatively, the first link and the second link can comprise different logical connections between the content provider and the user device, but can comprise the same physical path.

In an example, the second encoded content stream comprises the first encoded content stream re-encoded using a second encoding algorithm. In an example, the first encoded content stream can comprise a plurality of ordered blocks, sized for communication (e.g., as TCP segments, IP packets, Ethernet frames, or the like). In an example, the second encoded content stream can comprise data that can be used to reconstruct the first encoded content stream. In an example, the second encoded content stream can be produced by applying a logical operation to combine two adjacent blocks of the first encoded content stream. For example, the first block of the second encoded content stream can be formed by combining the first and second blocks of the first encoded content stream, the second block of the second encoded content stream can be formed by combining the second and third blocks of the first encoded content stream, etc. As an example, the first encoded content stream can comprise blocks (A1), (A2), (A3), (A4), etc., and the second encoded content stream can comprise blocks (A1+A2), (A2+A3), (A3+A4), etc. In an example, the logical operation can comprise a reversible logical operation. A reversible logical operation can be an operation where a complementary logical operation can be performed using an output of the logical operation to recreate inputs of the logical operation. For example, one such reversible logical operation is an exclusive or (XOR) operation (exclusive disjunction).

In step 408, the user device can determine that a second block of the first encoded content stream is missing. In an example, the second block of the first encoded content stream can be the block that immediately follows the first block of the first encoded content stream based on packet contents. In an example, the second block can be determined to be missing when a time threshold (e.g., a predefined time) elapses without receiving the block and/or when a number of subsequent blocks (e.g., third, fourth, and fifth blocks) are received without receiving the second block. For example, each block can comprise a sequence number to identify the position of the block in a transmission stream. For example, block 1 has a number 100001, block 2 has a number 100002, block 3 has a number 100003, etc. The three blocks can be assembled in order of the sequence number. If block 3 is received before block 2, the user device can determine that block 2 is missing.

In step 410, the user device can reconstruct the second block of the first encoded content stream based on the first block of the first encoded content stream and the first block of the second encoded content stream. In an example, the reconstruction can rely on a complementary logical operation (e.g., one that forms the complement of the logical operation used to combine the first and second blocks of the content) to reconstruct the block. For example, when an exclusive disjunction (XOR) operation is used to combine the two blocks, an exclusive disjunction can also be used to reconstruct the second block of the first encoded content stream using the first block of the first encoded content stream and the first block of the second encoded content stream. An exclusive disjunction can also be used to reconstruct the first block of the first encoded content stream based on the first block of the second encoded content stream and the second block of the first encoded content stream. As a particular example, the first encoded content stream can comprise encoded content blocks a1, a2, a3, a4, etc. The second encoded content stream can comprise encoded blocks formatted as (a1 $\oplus$ a2), (a2$\oplus$a3), (a3$\oplus$a4), etc. If the content block a3 is missing from the first encoded content stream, the user device can reconstruct the block a3 locally. The user device can perform a logical operation on the block (a2$\oplus$a3) of the second encoded content stream and the block a2 of the first encoded content stream to reconstruct the missing block a3 (e.g. (a2$\oplus$a3) $\oplus$ a2=a3). Thus, block a3 is reconstructed locally. Accordingly, the exclusive disjunction is a reversible logical operation that is its own complementary logical operation.

In an example, the user device can decode the first encoded content stream, including any reconstructed blocks, and display the decoded content as the requested content. In an example, the decoding can be performed based on methods to decode content, such as MPEG-2 or H.264 decoding.

Figure 5:
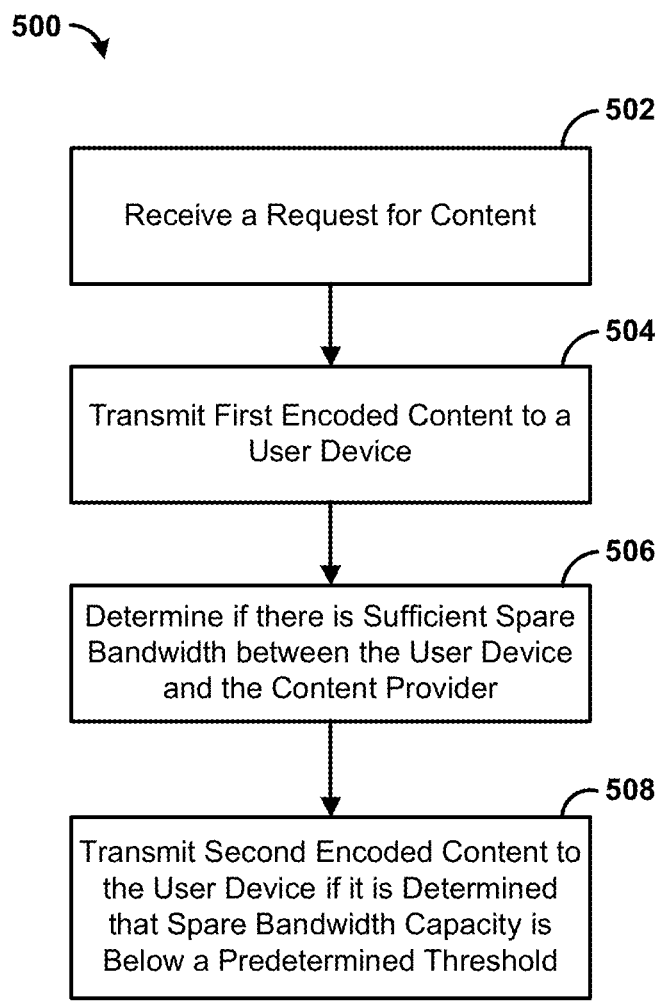
FIG. 5 is a flowchart illustrating an example method.

FIG. 5 shows an exemplary method 500. In step 502, the content provider (e.g., the central location 101) can receive a request for the content from a user device (e.g., the media device 120, the display 121, the communication terminal 122, and/or the mobile device 124). The request for content can comprise a request to view content, a request to store content, or the like. In an example, the request for content can comprise one or more parameters requesting transmission of the second encoded content stream. In another example, the request for content can comprise a first request for the first encoded content stream and a second request for the second encoded content stream.

In step 504, the content provider can transmit first encoded content stream to the user device in response to receiving the request for content. In an example, the transmission can comprise transmitting the first encoded content stream to the user device as streaming content. In an example, the first encoded content stream can be transmitted as segments using a TCP connection, as packets using an IP connection, or the like.

In an example, the first encoded content stream can be encoded using a first encoding algorithm to produce a first encoded content stream. In an example, the content can comprise video and/or audio content. As an example, the content can comprise video on demand (VOD) content. In an example, the content can be divided into a plurality of ordered blocks. The blocks can be sized for network communication as TCP segments, IP packets, Ethernet frames, or the like. Encoding the content can comprise encoding a video using a video encoding format such as MPEG-2, H.264, or other similar formats. In an example, the encoding can comprise separately encoding each of the blocks of the content, and including an error correcting code in each of the encoded blocks. The error correcting code can detect and/or correct errors within the block.

In step 506, the content provider can determine if there is sufficient bandwidth available between the user device and the content provider. For example, the content provider can determine if spare (e.g., unutilized) bandwidth available between the user device and the content provider exceeds a bandwidth threshold. As an example, each user may be allocated up to 50 MB/s in bandwidth between the user device and the content provider. If data is being transmitted from the content provider to the user device at a rate of 20 MB/s, then the spare bandwidth can be determined to be 30 MB/s. For example, the bandwidth threshold can be approximately 15 MB/s. In another example, the bandwidth threshold can be selected based on the bandwidth required for the first encoded content stream. In particular, the bandwidth threshold can be a percentage of the bandwidth required for transmission of the first encoded content stream. As examples, the bandwidth threshold can be 15%, 50%, 80%, or 100% of the bandwidth required for transmission of the first encoded content stream.

In step 508 in response to the determination that there is sufficient bandwidth available between the user device and the content provider, the content provider can transmit second encoded content stream to the user device. In an example, the second encoded content stream can be transmitted to the user device in parallel with the first encoded content stream. For example, the first encoded content stream and the second encoded content stream can be transmitted to the user device substantially simultaneously. In an example, the transmission can comprise transmitting the second encoded content stream to the user device as streaming content. In an example, the second encoded content stream can be transmitted as segments using a TCP connection, as packets using an IP connection, or the like. In an example, the second encoded content stream can be transmitted in the same way as the first encoded content stream. In another example, the second encoded content stream can be transmitted using a different method than the method used to transmit the first encoded content stream.

In an example, the first encoded content stream and the second encoded content stream can be transmitted to the user device via separate links. For example, the first encoded content stream can be transmitted from the content provider to the user device via a first link and the second encoded content stream can be transmitted from the content provider to the user device via a second link. In an example, the first link and the second link can comprise distinct physical paths from the content provider to the user device. Alternatively, the first link and the second link can comprise different logical connections between the content provider and the user device, but can comprise the same physical path.

In an example, the first encoded content stream can be encoded using a second encoding algorithm to produce the second encoded content stream. In an example, the first encoded content stream can be divided into a plurality of ordered blocks, sized for communication. In an example, the second encoded content stream can comprise data that can be used to reconstruct the first encoded content stream. The second encoded content stream can be produced by applying a logical operation to two subsequent blocks of the ordered blocks of the first encoded content stream. For example, the first block of the second encoded content stream can be formed by combining the first and second blocks of the first encoded content stream, the second block of the second encoded content stream can be formed by combining the second and third blocks of the first encoded content stream, etc. In an example, the logical operation can comprise a reversible logical operation. For example, a reversible logical operation is an operation where a complementary logical operation can be performed using an output of the logical operation to recreate inputs of the logical operation. One such reversible logical operation is an exclusive or (XOR) operation (exclusive disjunction).

In an example, the first encoded content stream and the second encoded content stream can be transmitted to the user device via separate links. For example, the first encoded content stream can be transmitted from the content provider to the user device via a first link and the second encoded content stream can be transmitted from the content provider to the user device via a second link. In an example, the first link and the second link can comprise distinct physical paths from the content provider to the user device. Alternatively, the first link and the second link can comprise different logical connections between the content provider and the user device, but can comprise the same physical path.

Figure 6:
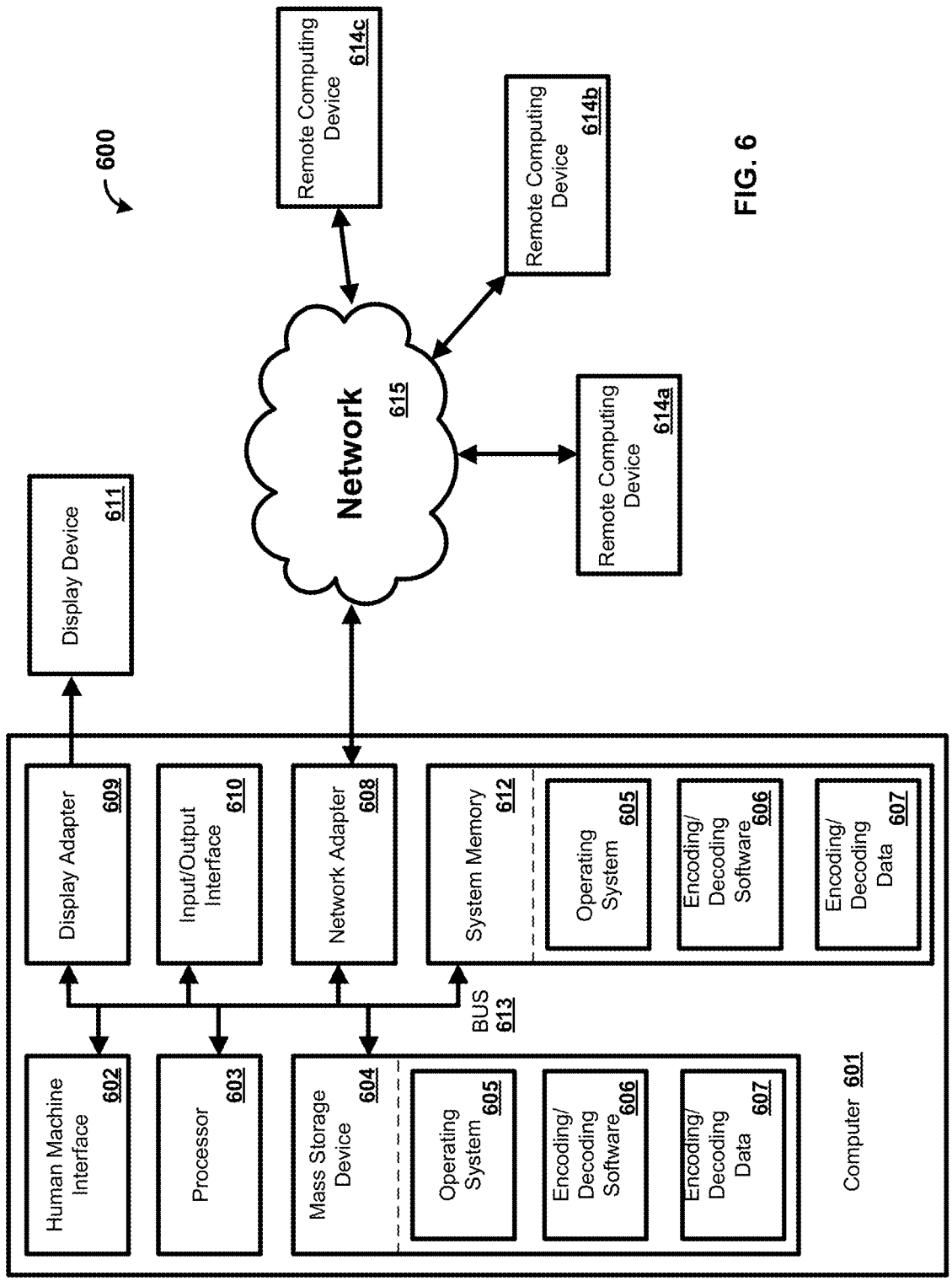
FIG. 6 is a block diagram illustrating an example computing device.

In an exemplary aspect, the methods and systems can be implemented on a computer 601 as illustrated in FIG. 6 and described below. By way of example, the media device 120, the display 121, the communication terminal 122, and/or the mobile device 124 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI- Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, encoding/decoding software 606, encoding/decoding data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as encoding/decoding data 607 and/or program modules such as operating system 605 and encoding/decoding software 606 that are immediately accessible to and/or are presently operated on by the processing unit 603.

In another example, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and encoding/decoding software 606. Each of the operating system 605 and encoding/decoding software 606 (or some combination thereof) can comprise elements of the programming and the encoding/decoding software 606. Encoding/decoding data 607 can also be stored on the mass storage device 604. Encoding/decoding data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another example, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another example, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through a network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of encoding/decoding software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
sending, to a user device, a first content stream using an available bandwidth, wherein the first content stream comprises a plurality of blocks; and
sending, to the user device, based on a quantity of spare bandwidth available exceeding an amount of bandwidth associated with the available bandwidth, a second content stream using the spare bandwidth, wherein the second content stream comprises at least one block of the plurality of blocks.

2. The method of claim 1, further comprising:
encoding, based on a first encoding algorithm, content to produce the first content stream comprising the plurality of blocks, wherein the first content stream comprises a first block of the plurality of blocks and a second block of the plurality of blocks that is adjacent to the first block of the plurality of blocks; and
encoding, based on a second encoding algorithm, the content to produce the second content stream comprising the at least one block of the plurality of blocks, wherein the at least one block comprises a combination of the first block of the plurality of blocks with the second block of the plurality of blocks.

3. The method of claim 2, wherein the first encoding algorithm, for each block of the plurality of blocks, produces a corresponding encoded block of the plurality of blocks of the first content stream.

4. The method of claim 2, wherein encoding the content to produce the second content stream comprises combining, based on a logical exclusive or (XOR) operation, the first block of the plurality of blocks with the second block of the plurality of blocks to form the at least one block of the plurality of blocks.

5. The method of claim 1, wherein the plurality of blocks comprises at least one error correcting code.

6. The method of claim 1, further comprising determining the available bandwidth for communication with the user device.

7. The method of claim 1, wherein the first content stream is sent via a first link, and wherein the second content stream is sent via a second link.

8. An apparatus comprising:
one or more processors; and
a memory storing processor-executable instructions that, when executed by the one or more processors, cause the apparatus to:
send, to a user device, a first content stream using an available bandwidth, wherein the first content stream comprises a plurality of blocks; and
send, to the user device, based on a quantity of spare bandwidth available exceeding an amount of bandwidth associated with the available bandwidth, a second content stream using the spare bandwidth, wherein the second content stream comprises at least one block of the plurality of blocks.

9. The apparatus of claim 8, wherein the processor-executable instructions, when executed by the one or more processors, further cause the apparatus to:
encode, based on a first encoding algorithm, content to produce the first content stream comprising the plurality of blocks, wherein the first content stream comprises a first block of the plurality of blocks and a second block of the plurality of blocks that is adjacent to the first block of the plurality of blocks; and
encode, based on a second encoding algorithm, the content to produce the second content stream comprising the at least one block of the plurality of blocks, wherein the at least one block comprises a combination of the first block of the plurality of blocks with the second block of the plurality of blocks.

10. The apparatus of claim 9, wherein the first encoding algorithm, for each block of the plurality of blocks, produces a corresponding encoded block of the plurality of blocks of the first content stream.

11. The apparatus of claim 9, wherein the processor-executable instructions that cause the apparatus to encode the content to produce the second content stream further cause the apparatus to combine, based on a logical exclusive or (XOR) operation, the first block of the plurality of blocks with the second block of the plurality of blocks to form the at least one block of the plurality of blocks.

12. The apparatus of claim 8, wherein the plurality of blocks comprises at least one error correcting code.

13. The apparatus of claim 8, wherein the processor-executable instructions, when executed by the one or more processors, further cause the apparatus to determine the available bandwidth for communication with the user device.

14. The apparatus of claim 8, wherein the first content stream is sent via a first link, and wherein the second content stream is sent via a second link.

15. One or more non-transitory computer-readable media storing processor-executable instructions that, when executed by at least one processor, cause the at least one processor to:

send, to a user device, a first content stream using an available bandwidth, wherein the first content stream comprises a plurality of blocks; and send, to the user device, based on a quantity of spare bandwidth available exceeding an amount of bandwidth associated with the available bandwidth, a second content stream using the spare bandwidth, wherein the second content stream comprises at least one block of the plurality of blocks.

16. The one or more non-transitory computer-readable media of claim 15, wherein the processor-executable instructions, when executed by the at least one processor, further cause the at least one processor to:

encode, based on a first encoding algorithm, content to produce the first content stream comprising the plurality of blocks, wherein the first content stream comprises a first block of the plurality of blocks and a second block of the plurality of blocks that is adjacent to the first block of the plurality of blocks; and encode, based on a second encoding algorithm, the content to produce the second content stream comprising the at least one block of the plurality of blocks, wherein the at least one block comprises a combination of the first block of the plurality of blocks with the second block of the plurality of blocks.

17. The one or more non-transitory computer-readable media of claim 16, wherein the first encoding algorithm, for each block of the plurality of blocks, produces a corresponding encoded block of the plurality of blocks of the first content stream.

18. The one or more non-transitory computer-readable media of claim 16, wherein the processor-executable instructions that cause the at least one processor to encode the content to produce the second content stream further cause the at least one processor to combine, based on a logical exclusive or (XOR) operation, the first block of the plurality of blocks with the second block of the plurality of blocks to form the at least one block of the plurality of blocks.

19. The one or more non-transitory computer-readable media of claim 15, wherein the plurality of blocks comprises at least one error correcting code.

20. The one or more non-transitory computer-readable media of claim 15, wherein the processor-executable instructions, when executed by the at least one processor, further cause the at least one processor to determine the available bandwidth for communication with the user device.

21. The one or more non-transitory computer-readable media of claim 15, wherein the first content stream is sent via a first link, and wherein the second content stream is sent via a second link.

22. A system comprising:
a computing device configured to:
send, to a user device, a first content stream using an available bandwidth, wherein the first content stream comprises a plurality of blocks; and
send, to the user device, based on a quantity of spare bandwidth available exceeding an amount of bandwidth associated with the available bandwidth, a second content stream using the spare bandwidth, wherein the second content stream comprises at least one block of the plurality of blocks.

23. The system of claim 22, wherein the computing device is further configured to:
encode, based on a first encoding algorithm, content to produce the first content stream comprising the plurality of blocks, wherein the first content stream comprises a first block of the plurality of blocks and a second block of the plurality of blocks that is adjacent to the first block of the plurality of blocks; and
encode, based on a second encoding algorithm, the content to produce the second content stream comprising the at least one block of the plurality of blocks, wherein the at least one block comprises a combination of the first block of the plurality of blocks with the second block of the plurality of blocks.

24. The system of claim 23, wherein the first encoding algorithm, for each block of the plurality of blocks, produces a corresponding encoded block of the plurality of blocks of the first content stream.

25. The system of claim 23, wherein the computing device configured to encode the content to produce the second content stream is further configured to combine, based on a logical exclusive or (XOR) operation, the first block of the plurality of blocks with the second block of the plurality of blocks to form the at least one block of the plurality of blocks.

26. The system of claim 22, wherein the plurality of blocks comprises at least one error correcting code.

27. The system of claim 22, wherein the computing device is further configured to determine the available bandwidth for communication with the user device.

28. The system of claim 22, wherein the first content stream is sent via a first link, and wherein the second content stream is sent via a second link.

29. The system of claim 22, wherein the computing device is further configured to cause the user device to reconstruct, based on the first content stream and the second content stream, a missing block from the plurality of blocks.

30. The system of claim 22, wherein the plurality of blocks of the first content stream comprises video-on-demand (VOD) content encoded using a first encoding algorithm and the at least one block of the second content stream comprises the VOD content encoded using a second encoding algorithm.

31. The method of claim 1, further comprising causing the user device to reconstruct, based on the first content stream and the second content stream, a missing block from the plurality of blocks.

32. The method of claim 1, wherein the plurality of blocks of the first content stream comprises video-on-demand (VOD) content encoded using a first encoding algorithm and the at least one block of the second content stream comprises the VOD content encoded using a second encoding algorithm.

33. The apparatus of claim 8, wherein the processor-executable instructions, when executed by the one or more processors, further cause the apparatus to cause the user device to reconstruct, based on the first content stream and the second content stream, a missing block from the plurality of blocks.

34. The apparatus of claim 8, wherein the plurality of blocks of the first content stream comprises video-on-demand (VOD) content encoded using a first encoding algorithm and the at least one block of the second content stream comprises the VOD content encoded using a second encoding algorithm.

35. The one or more non-transitory computer-readable media of claim 15, wherein the processor-executable instructions that cause the at least one processor to cause the user device to reconstruct, based on the first content stream and the second content stream, a missing block from the plurality of blocks.

36. The one or more non-transitory computer-readable media of claim 15, wherein the plurality of blocks of the first content stream comprises video-on-demand (VOD) content encoded using a first encoding algorithm and the at least one block of the second content stream comprises the VOD content encoded using a second encoding algorithm.

* * * * *